(12) United States Patent
Schläpfer et al.

(10) Patent No.: US 6,435,034 B1
(45) Date of Patent: Aug. 20, 2002

(54) PIEZO-ELECTRIC STRETCHING DETECTOR AND METHOD FOR MEASURING STRETCHING PHENOMENA USING SUCH A DETECTOR

(75) Inventors: Bruno Schläpfer, Hagenbuch; Dario Mächler, Zell; Matthias Tanner, Hemishofen, all of (CH)

(73) Assignee: Hera Rotterdam B.V. (NL)

( * ) Notice: Subject to any disclaimer, the term of this patent is extended or adjusted under 35 U.S.C. 154(b) by 0 days.

(21) Appl. No.: 09/554,574

(22) PCT Filed: Nov. 18, 1998

(86) PCT No.: PCT/CH98/00496

§ 371 (c)(1),
(2), (4) Date: May 16, 2000

(87) PCT Pub. No.: WO99/26046

PCT Pub. Date: May 27, 1999

(30) Foreign Application Priority Data

Nov. 18, 1997 (CH) .............................................. 2659/97

(51) Int. Cl.[7] .............................................. G01B 7/16
(52) U.S. Cl. .............................. 73/768; 73/775; 73/824
(58) Field of Search ........................... 73/760, 768, 774, 73/775, 776, 777, 818, 824

(56) References Cited

U.S. PATENT DOCUMENTS

| | | | |
|---|---|---|---|
| 2,558,563 A | | 6/1951 | Jansen |
| 4,393,713 A | * | 7/1983 | Guillemot .................. 73/701 |
| 5,284,062 A | * | 2/1994 | Ryffel .......................... 73/768 |
| 5,329,823 A | * | 7/1994 | Sonderegger et al. .... 73/862.64 |
| 5,373,360 A | * | 12/1994 | Martin et al. ................ 356/350 |
| 5,616,847 A | * | 4/1997 | Schlapfer .................... 73/774 |
| 6,069,359 A | * | 5/2000 | Imada et al. ............. 250/338.3 |

FOREIGN PATENT DOCUMENTS

| | | |
|---|---|---|
| EP | 0012867 | 2/1982 |
| EP | 0363785 | 4/1990 |
| EP | 0459069 | 7/1994 |

* cited by examiner

Primary Examiner—Max Noori
(74) Attorney, Agent, or Firm—Bachman & LaPointe, P.C.

(57) ABSTRACT

The present invention relates to a piezo-electric stretching detector which is used for measuring the positive and negative stretching on the surfaces of rigid structures using electric signals, wherein said detector can be attached by a force connection onto said surfaces in a compressible or non-removable relation. This stretching detector has a high sensitivity in all stretching directions and is made of a piezo-ceramic material which is applied in a thin layer on at least one surface of a flexible metal sheet or which is fixedly attached to said metal sheet in the shape of a moulded body. At least one of said stretching detectors can be arranged on the free abutting end of at least one resilient pressure body which is imbedded in the reception housing of a stretching sensor. The stretching sensor further comprises members for pressing the reception housing onto the surface to be measured. According to one method for measuring the positive and negative stretching on the surfaces of rigid structures using a stretching detector or sensor, the piezo-electrically emitted charges are amplified in charge amplifiers so as to obtain output signals which can be used by the controllers and have a voltage proportional thereto. The charge amplifier can also be switched rapidly from reduced charge ranges to very wide charge ranges.

11 Claims, 3 Drawing Sheets

Figure 5:
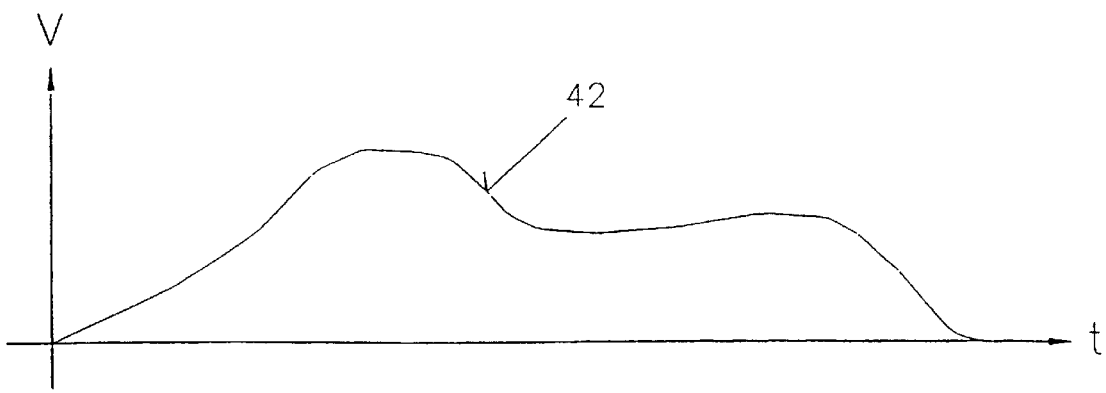

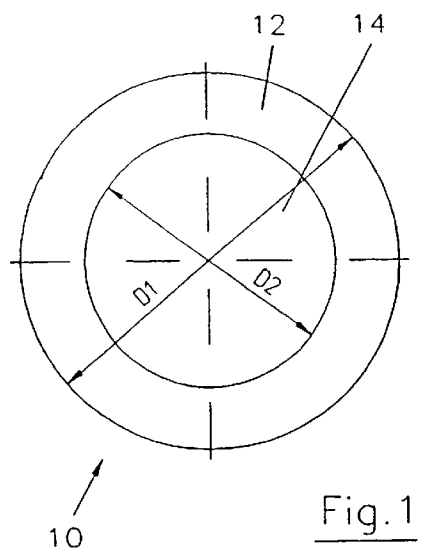
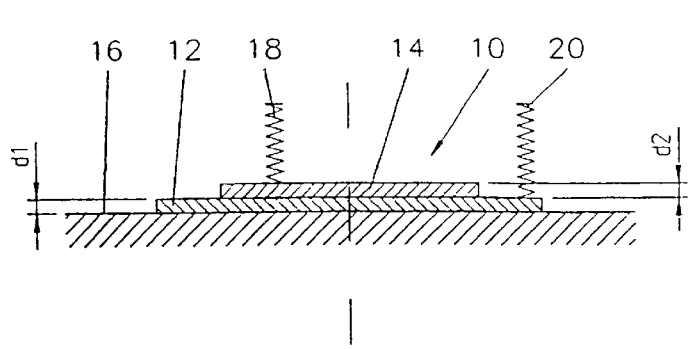
Fig.1  Fig.2
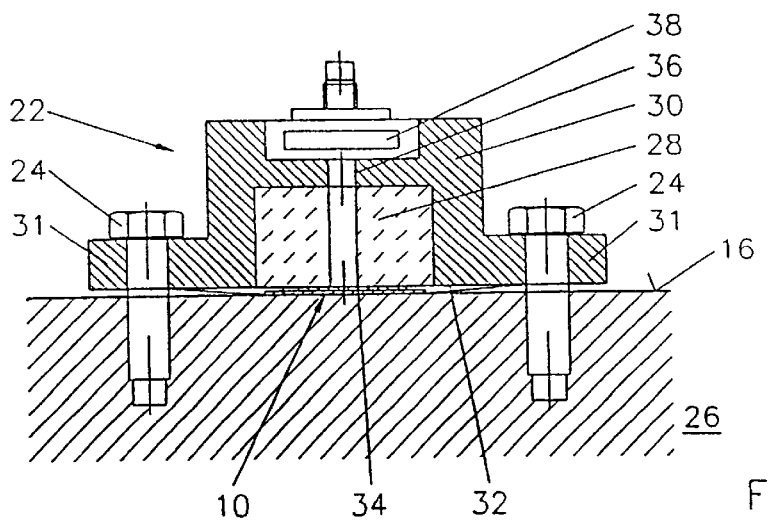
Fig.3
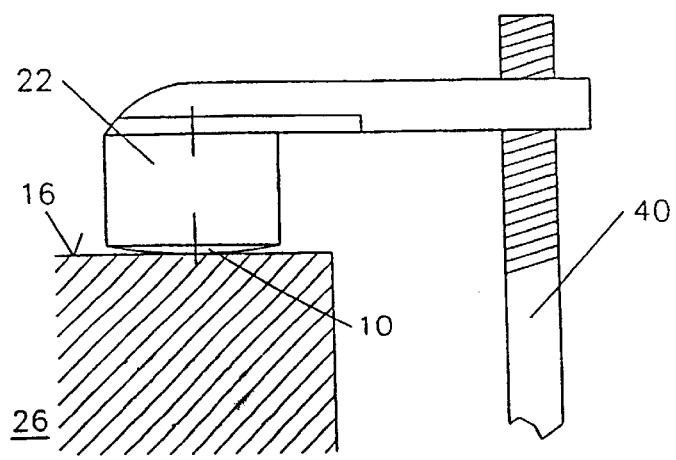
Fig.4

PIEZO-ELECTRIC STRETCHING DETECTOR AND METHOD FOR MEASURING STRETCHING PHENOMENA USING SUCH A DETECTOR

The present invention concerns a piezo-electric elongation sensor for measuring positive and negative elongations on surfaces of rigid structures by means of electrical signals, where the elongation sensor can be pressed in a force fit onto this surface or permanently attached to it. The invention also concerns an elongation detector with at least one elongation sensor and a process for electrical measurement with an elongation sensor or elongation detector.

It has long been known that on application of a force to a piezo-electric body, due to the dielectric shift, surface charges occur which are detected with electrodes. It is also known in press and tool construction but also on other rigid structures to use piezo-electric elongation sensors as surface elongation sensors. On these rigid structures and on robust machine tools, elongation sensors with a high degree of resolution are required. Elongation sensors with high sensitivity are also required for monitoring parts clamped between two tool halves and not removed from the mould, as for example on a 1000 kN press up to 50 N must be detected. In this order of magnitude one microstrain ($\mu\epsilon$) must be able to emit a 10 Volt signal (V). No elongation sensors or corresponding processes known today are able to do this.

In contrast elongation detectors are known which are pressed onto the surface to be measured by means of two screws, so that elongations occurring axially between the two screws can be measured. By means of mechanical amplification the surface elongation can be amplified for example by up to a factor of 10. Such detectors as indicated have the disadvantage that only axial elongations between the two screws can be detected and the sensitivity does not achieve the required resolution.

Piezo-electric action sensors are also known which are pressed onto the surface to be measured by just one screw. Here two integrated piezo-quartz discs are loaded with thrust forces, the electric charges generated can be detected. These elongation sensors however give too low a resolution. CH,A5 687647 describes detectors with elongation-sensitive elements, i.e. elongation sensors, which can include piezo films. According to this Swiss patent specification also, because of the choice of measuring elements it has not been possible to measure with the high resolution required for special applications for example in the press, tooling and machine tool industries.

Furthermore, all sensors stated above must be fitted direction-dependent, in other words to achieve optimum measurement results the main elongation direction must always be found. In most cases however this involves great extra cost.

The present invention is therefore based on the task of obtaining, with a piezo-electric elongation sensor of the type stated above, direction-independent elongation measurements with high resolution. The elongation sensor can be used in an optimally adapted elongation detector using an optimum process.

With regard to the elongation sensor, the task is solved according to the invention in that an elongation sensor, highly sensitive in all elongation directions, consists of a piezo-ceramic material which is applied as a thin layer on at least one side of a flexible metal plate or permanently attached to this as a moulded body. Special and further design forms of the elongation sensor arise from the dependent claims.

In the elongation measurement according to the invention, there is no direct force action on the piezo-ceramic material as is otherwise the case. In metal-metal-ceramic connections, tangential forces as a result of positive or negative elongations are transferred from the surface to be measured to the metal plate and thence to the elongation sensor where they create surface charges which can be detected. Thanks to the replacement of the previous conventional piezo-electric materials by piezo-ceramics, even the smallest elongations generate such large electrical charges that they can be evaluated directly or suitably with charge amplifiers.

Piezo-ceramic materials are known in themselves, these are usually oxidic materials based for example on lead oxide, zirconium oxide and titanium oxide. By the addition of further metal oxides for example oxides of the elements lithium, magnesium, zinc, nickel, manganese, niobium, antimony and/or strontium, the material parameters can be finely matched and stabilised. Furthermore the physical properties of the piezo-ceramic materials can be influenced by varying the mixing ratio of the base materials, the grinding duration of the components, the sintering conditions and the forming.

Lead-zirconate-titanate, known in itself as a piezo-ceramic is preferably used according to the invention. The crystal structure of lead-zirconate-titanate is derived from perovskite, a mineral with chemical formula $CaTiO_3$.

The carrier for the piezo-ceramic material preferably consists of a metal disc punched out of a steel or brass plate of a thickness of suitably 0.05 to 0.25 mm and with a diameter in the range of 10 to 60 mm. The piezo-ceramic material is permanently attached coaxially, preferably with a diameter of 5–30 mm and a thickness of suitably 0.05 to 0.25 mm. This can be achieved firstly by gluing or soldering a preshaped ceramic disc or secondly by chemical deposition from the gaseous phase, a process known as CVD (chemical vapour deposition), electrochemical deposition or vaporisation on the metal plate. The adhesion strength of the piezo-ceramic on the metal disc, however it is applied, must fulfil high requirements. Bending around a round bar of 10 mm diameter must not lead to any separation between the piezo-ceramic and the metal disc.

According to a particularly advantageous embodiment of the invention, the elongation sensors are formed as piezo-ceramic transducer membranes. These have a mechanical fundamental resonance which is defined by the geometry. In addition to the fundamental resonance, harmonic oscillations and resonances occur in the longitudinal and transverse direction, for discs in particular also in the radial direction if the diameter is essentially greater than the thickness.

With an elongation sensor according to the invention for example the following technical data can be achieved:

| | | |
|---|---|---|
| Measurement range max/min | $\mu\epsilon$ | 500 |
| Overload range | $\mu\epsilon$ | 1000 |
| Sensitivity of piezo-ceramic sensor | $pC/\mu\epsilon$ | ≈7000 (independent of direction) |
| Temperature range of piezo-ceramic sensor (Ø 10 mm) | ° C. | 50 (permanent temperature: 35) |
| Linearity and hysteresis | % FS | 1 – 2 |

The piezo-ceramic elongation sensor according to the invention can also be used for monitoring tasks on very rigid fast-running presses to detect process faults, for example in the form of seized parts. Furthermore the elongation sensor can be used for mould protection in injection moulding and metal diecasting tools by being pressed on or attached at an optimum point on the machine structure, for example on a toggle lever. Deviations from the ideal closing curve can be measured with high resolution according to the invention. Thus 5 kg can be detected on a 100 t press. Despite this, a 500 times greater elongation can also be detected using the same elongation sensor.

The piezo-ceramic elongation sensor can be pressed onto a surface to be measured with any suitable resilient contact body until a force or friction fit is achieved between the metal plate and the surface. The metal plate can also be glued, soldered or permanently connected in another suitable manner to the surface to be measured. In all cases positive and negative elongations are transferred from the surface to the metal plate of the elongation sensor and from this to the piezo-ceramic material. This piezo-electric measurement principle allows resolutions in the nanometre band.

A particularly advantageous elongation detector with at least one piezo-ceramic elongation sensor is characterised in that the elongation sensors are arranged on the free face of at least one resilient pressure body inlet with a projection into a detector housing which is stable in itself, and comprises means for pressing the detector housing onto the surface to be measured.

This detector housing is preferably penetrated by a screw hole or has at least two flanges flush with the opening and evenly distributed over the periphery, each with a screw hole or slot. The detector housing which is stable in itself thus allows a strong pressure of the elongation sensor onto the surface to be measured by way of the resilient pressure body.

Suitably the elongation sensors on the projecting pressure body of the elongation detector are covered with a metallic or metallised film and are thus protected from harmful chemical and/or mechanical effects. This film can be removed for installation of the elongation detector, preferably the elongation detector is attached with the protective film applied.

In relation to the process for electric measurement with an elongation sensor or elongation detector, the task is solved according to the invention in that the piezo-ceramic emitted charges are amplified in a charge amplifier into output signals which can be used by controls and which have a voltage proportional to the charge, where the charge amplifier switches very quickly from small to very large charge bands if necessary.

The high sensitivity of the elongation sensors or elongation detector according to the invention, connected with the high measurement band of up to 500 microstrains, requires immediately a charge amplifier, known in itself, with a very fast band change in the microsecond range, from an extremely small measurement band to a large measurement band. Thus for example with one and the same elongation sensor both high sensitivity mould protection and total force measurement can be achieved.

Charge amplifiers convert the charge emitted by the elongation sensor into a voltage proportional to this. This is usually achieved in that the charge emitted by the elongation sensor creates, at the inverting input of an operational amplifier, an inversely proportional current in a feedback branch. If the current in the feedback branch is allowed to flow through a capacitor, at the output to the operational amplifier a voltage proportional to the sensor signal is generated. As the insulation resistance is not infinitely high and the fault currents of the operational amplifier are not zero, over time at the output of the operational amplifier a voltage perceptible as a residual deflection occurs, the so-called drift. It is therefore necessary to reset the output voltage from time to time or discharge the capacitor fully in the feedback branch.

The output voltage is firstly proportional to the sensor signal and secondly dependent on the capacitance of the capacitor in the feedback branch. This capacitance determines how much charge is required to achieve a particular voltage value. It is therefore known as a band capacitor.

To produce a charge amplifier with two or more measurement ranges, the output voltage is amplified by the required factor. This gives a more sensitive measurement band in the simplest manner.

It is reasonable that the capacitance of the band capacitor must be adapted to the largest measurement band required, as by amplification only smaller measurement bands can be implemented. As long as the amplification factor is not selected too high (typical values are factors from 2 to 10), the drift is not important as this too is amplified by the relevant factor. If however the charge amplifier is to be produced with bands lying far apart, this solution is no longer likely to be successful.

For large band differences, a circuit variant with a switchable band capacitor must be selected. Here the bands can stand in any ratio to each other and the limits are set only by the stepping of the capacitance by the manufacturer.

According to a special design form of the process, to eliminate mechanical faults at high resolution measurements initially an ideal curve is recorded and stored. Each further cycle is monitored and compared in real time with the ideal curve. When a fault occurs in real time, the ideal curve is subtracted from the fault curve, the difference compared directly with an alarm threshold and the fault detected as an alarm threshold value.

In contrast to processes previously known for elongation measurement, all elongations occurring on the surface can be detected direction-independently. The complex and restrictive definition of a main direction can be omitted.

The measurements on the surface can be carried out not only with pressure sensors pressed on to create a force fit. The metal plate of the elongation sensor according to the invention can be glued or soldered to the surface to be measured. This must be done with such high quality that the smallest elongations, in the nanometre band, are transferred to the piezo-ceramic material.

Figure 6:
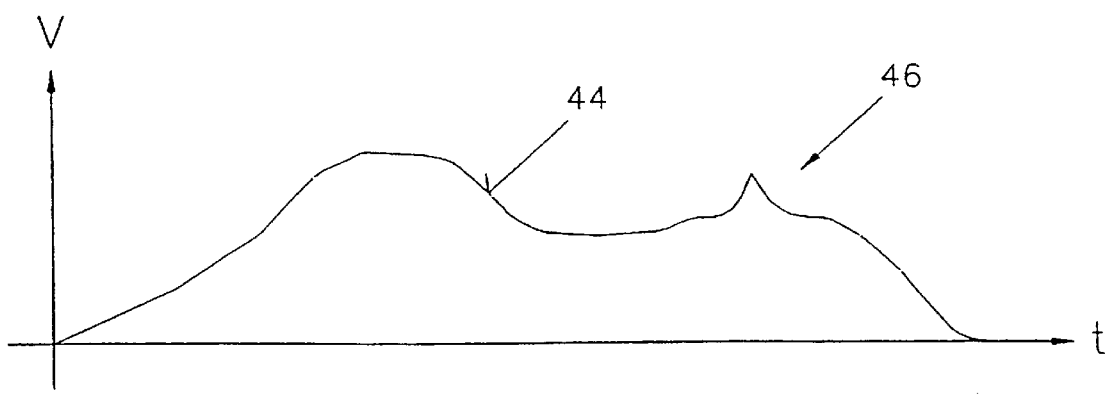
Figure 7:
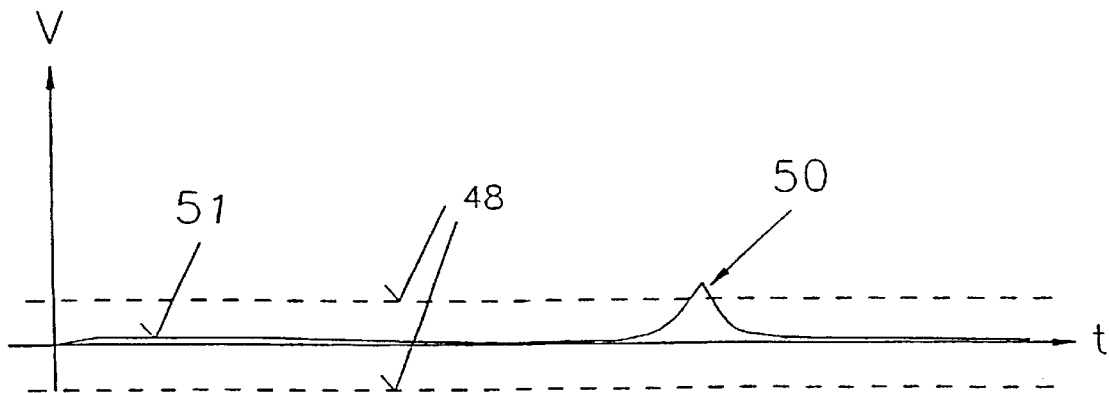
Figure 8:
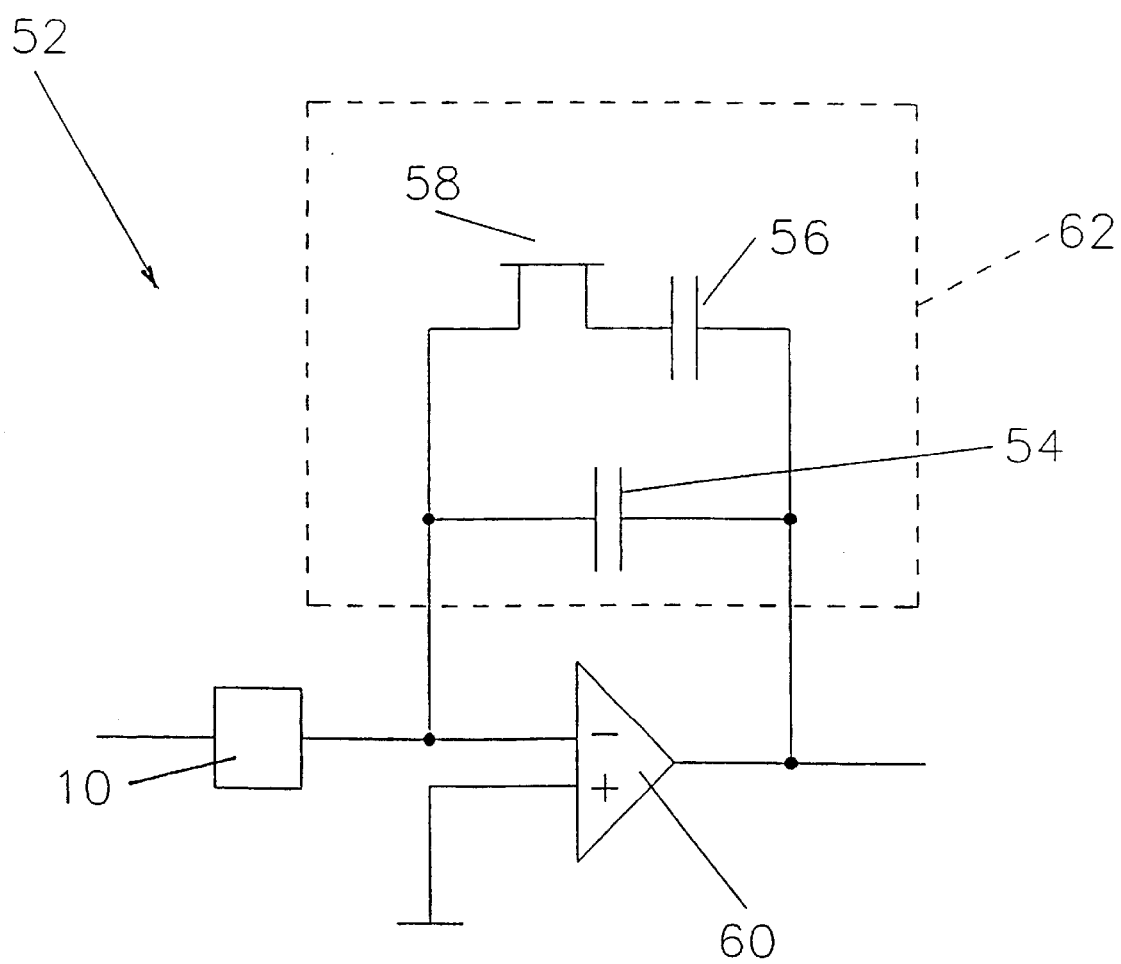

The invention is now explained in more detail using the embodiments shown in the drawing which are also the subject of dependent claims. These show:

FIG. 1 a top view onto an elongation sensor,

FIG. 2 an axial section through an applied elongation sensor,

FIG. 3 an axial section through an elongation detector with an elongation sensor in the fitted position, FIG. 4 a sectional view of an attachment variant of an elongation detector, FIG. 5 a sensor signal in a full cycle, FIG. 6 a sensor signal with a fault, FIG. 7 an alarm threshold value, and FIG. 8 a charge amplifier.

FIG. 1 shows an elongation-sensitive element, an elongation sensor 10. This consists of a metal disc 12, in the present case a steel disc with a diameter $D_1$ of 15 mm and a coaxial disc-shaped moulded body of piezo-ceramic material 14, in the present case with diameter $D_2$ of 10 mm.

FIG. 2 shows an axial section of an elongation sensor 2 which is soldered onto a surface 16 to be measured. The thickness $d_1$ of the steel disc 12 is 0.15 mm, that of the glued-on disc-shaped piezo-ceramic material 14, 0.10 mm. The two discs are joined together with an electrically conductive adhesive. A spring 18 pressing on the piezoceramic material 14 acts as an electrical contact and conductor for the electrical charges. The earth contact is achieved by way of a further spring 20 pressing onto the steel disc 12 or, in embodiments not shown, directly by way of the surface 16.

When a high sensitivity elongation sensor 10 described here is used with lead- zirconate-titanate as a piezo-ceramic material 14, 1 microstrain ($\mu\epsilon$) gives a charge of approx. 700 pC, which with suitable charge amplifiers (FIG. 8) can be converted into an output signal of around 10 Volt.

An elongation detector 22 shown in FIG. 3 with an elongation sensor 10 is screwed by means of screws 24 onto the surface 16 of a very rigid structure 26 to be measured e.g. a very fast running press 26. A resilient pressure body 28 is pressed so hard onto the surface 16 that the elongation sensors 10 applied to the face of this pressure body 28 are connected by force fit with the surface 16, i.e. they create a friction joint. Thus any elongation occurring on surface 16 is transferred 1:1 to the elongation sensor 10 which in turn emits an elongation-proportional signal. The resilient pressure body 12 is formed in any shape and thickness, of one piece or several pieces, so that at least one elongation sensor 10 is placed on the face.

A detector housing 30 with flanges 31 and recesses for the resilient pressure body or bodies 28 is designed to be stable and robust in itself. With regard to depth and shape the detector housing 30 is structured such that the integral resilient pressure body 28 projects slightly and thus by the screw attachment exerts a strong pressure on elongation sensor 10. The elongation sensors 10 are protected against external influences by means of a metallic or metallised film 32.

The signals of the elongation sensor 10 are passed by way of cables or springs 18, 20 (FIG. 2) through axial bores 34, 36 in the resilient pressure body 28 and in the detector housing 30. A spring instead of a cable prevents undesirable reinforcement of the piezo-ceramic material 14 (FIGS. 1, 2), mainly structured as a transducer membrane of lead-zirconate-titanate, of the elongation sensor 10. In the detector housing 30 are fitted suitable analysis electronics 38 which process the electrical signals of the elongation sensor.

An elongation detector 22 shown in FIG. 4 is pressed with a screw clip 40 onto the surface 16 to be measured. Here too under strong pressure a force fit connection of the elongation sensor 10 with surface 16 is achieved. Otherwise FIG. 4 largely corresponds to FIG. 3.

The extraordinarily high signal levels, 1 microstrain ($\mu\epsilon$)=700 pC=10 Volt with charge amplifiers, are difficult to control since for example acceleration components, valve impacts and other influences of a machine can generate signals in the Volt range.

FIGS. 5 to 7 show a process which eliminates such disruptive influences in the evaluation. The ordinate is the sensor signal $V_1$ and the abscissa is the time axis t.

At first the machine runs through a full cycle in learn mode and the values are stored. This gives a curve according to FIG. 5. This curve is now taken as an ideal curve 42 and stored. Each further production cycle is then monitored and compared in real time with ideal curve 42. A fault occurs in curve 44 according to FIG. 6 and is shown by a signal peak 46.

According to FIG. 7, the ideal curve 42 (FIG. 2) is subtracted from the fault curve 44 (FIG. 6) in real time and then compared directly with alarm threshold 48, the resulting curve 51 of the signal peak 46 corresponding to the fault (FIG. 6) can be detected as an alarm threshold value 50.

A charge amplifier 52 for sensor signals is designed according to the diagram in FIG. 8. Here a large band capacitor 56 is switched to a small band capacitor 54 by means of an electronic switch 58. It can be designed as FET, semi-conductor relay or optocoupler. In order to keep the drift as small as possible even in the small band, as an operational amplifier 60, as high ohmic version as possible with the minimum input current is used. The operational amplifier 60 causes an inversely proportional current in a feedback branch 62.

Thus with the high resolution elongation sensors according to the invention, monitoring can be performed under industrial production conditions as valve strokes, acceleration components and other mechanical influences are eliminated regularly, cycle by cycle.

What is claimed is:

1. An elongation detector for measuring positive and negative elongations on a surface of a rigid structure by means of electrical signals comprising:
   a detector housing;
   at least one resilient pressure body located in the detector housing, the at least one resilient pressure body having a free face;
   at least one elongated sensor comprising a flexible metal plate having a layer of piezo-ceramic material having a surface bond to one surface of the plate, wherein the other surface of the plate is in contact with the surface of the rigid structure and the other surface of the piezo-ceramic material contacts the free face of the at least one resilient pressure body; and
   means for pressing the detector housing toward the surface of the rigid structure for providing contact.

2. A process for electrical measurement of positive and negative elongations on surfaces of rigid structures with an elongation sensor according to claim 1, wherein the piezo-ceramic material emitted charges are amplified by a charge amplifier into output signals which can be used by controls and which have a voltage proportional to the charge, where the charge amplifier switches very quickly from small to very large charge bands.

3. A process according to claim 2, wherein to eliminate mechanical faults in high resolution measurements, initially an ideal curve is recorded and stored, each further cycle monitored and compared in real time with the ideal curve, on the occurrence of a fault in real time the ideal curve is subtracted from the fault curve, the difference compared directly with an alarm threshold and the fault detected as an alarm threshold value.

4. A process according to claim 3, wherein all elongations occurring on the surface are detected direction-independently.

5. A process according to claim 4, wherein the elongations are detected with the metal plate of the elongation sensor on the surface of the rigid structure.

6. A process according to claim 2, wherein the charge amplifier switches in the microsecond range from elongation measurements with a resolution in the nanometre band to measurement of greater elongations by up to around 1000 times.

7. An elongation detector according to claim 1, wherein the detector housing includes at least two flanges provided with openings distributed evenly thereon.

8. An elongation detector according to claim 1, wherein analysis electronics are arranged in the detector housing.

9. An elongation detector according to claim 8, wherein an electrically conductive means is guided through an axial bore in the resilient pressure body and the detector housing and the electrically conductive means is connected to the analysis electronics.

10. An elongation detector according to claim 1, wherein the elongation sensor is covered with an electrically conductive film.

11. An elongation detector according to claim 1 wherein the piezo-ceramic material has a thickness ($d_2$) 0.05 to 0.25 mm and the metal plate has a thickness ($d_1$) 0.05 to 0.25 mm.

* * * * *